United States Patent
Parampottil

(10) Patent No.: US 9,930,171 B1
(45) Date of Patent: Mar. 27, 2018

(54) SYSTEMS AND METHODS FOR IDENTIFICATION AND ACTION ON ATTEMPTED CONTROLLED-ENVIRONMENT FACILITY RESIDENT COMMUNICATIONS WITH INTERNET-PROTOCOL PHONE NUMBERS

(71) Applicant: Securus Technologies, Inc., Dallas, TX (US)

(72) Inventor: Isaac Parampottil, Coppell, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 15/195,204

(22) Filed: Jun. 28, 2016

(51) Int. Cl.
- *H04M 1/56* (2006.01)
- *H04M 3/00* (2006.01)
- *H04M 3/22* (2006.01)
- *H04M 3/42* (2006.01)
- *H04L 29/12* (2006.01)
- *H04M 3/38* (2006.01)
- *H04M 3/54* (2006.01)

(52) U.S. Cl.
CPC ........ *H04M 3/2281* (2013.01); *H04L 61/605* (2013.01); *H04M 3/38* (2013.01); *H04M 3/42068* (2013.01); *H04M 3/42263* (2013.01); *H04M 3/543* (2013.01)

(58) Field of Classification Search
USPC ............... 379/142.01, 188, 210.02
See application file for complete search history.

(56) References Cited

U.S. PATENT DOCUMENTS

| | | | | |
|---|---|---|---|---|
| 6,920,209 B1* | 7/2005 | Gainsboro | .......... | H04M 3/2281 379/188 |
| 2004/0029564 A1* | 2/2004 | Hodge | .......... | H04M 1/67 455/411 |
| 2006/0007486 A1* | 1/2006 | Tanimoto | .......... | H04N 1/00214 358/1.15 |
| 2006/0154661 A1* | 7/2006 | Gonen | .......... | H04L 63/08 455/435.1 |
| 2010/0014644 A1* | 1/2010 | Bajpay | .......... | H04L 41/0613 379/1.04 |
| 2013/0263227 A1* | 10/2013 | Gongaware | .......... | H04L 63/08 726/4 |

* cited by examiner

*Primary Examiner* — Quoc D Tran
(74) *Attorney, Agent, or Firm* — Fogarty LLP

(57) ABSTRACT

A controlled-environment facility communications management system, and/or the like, receives an indication of an electronic communication request with a telephone number initiated by, or to, a resident of a controlled environment facility. The controlled-environment facility communications management system, and/or the like, accesses a line information database and determines, based on the contents of the line information database, whether the telephone number is an Internet Protocol (IP) telephone number. The controlled-environment facility communications management system, and/or the like, takes action with respect to the electronic communication in response to identification of the telephone number as an IP telephone number.

22 Claims, 4 Drawing Sheets

SYSTEMS AND METHODS FOR IDENTIFICATION AND ACTION ON ATTEMPTED CONTROLLED-ENVIRONMENT FACILITY RESIDENT COMMUNICATIONS WITH INTERNET-PROTOCOL PHONE NUMBERS

TECHNICAL FIELD

This specification is related to communications by residents of controlled-environment facilities, specifically to communication attempts by residents of controlled-environment facilities with Internet Protocol (IP) telephone numbers, and particularly to controlled-environment facility communications systems identifying and taking action on resident calls with IP telephone numbers.

BACKGROUND

According to the International Centre for Prison Studies, the United States has the highest prison population per capita in the world. In 2009, for example, one out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services provide residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

Still, residents of controlled-environment facilities, particularly inmates of correctional facilities, are generally restricted in their communications with the public. In many prisons, for example, inmates are only allowed to communicate with approved parties through secure and monitored communication systems provided and maintained by the prison administration or by a third-party contractor associated with the prison administration.

SUMMARY

The present invention is directed to systems and methods which provide controlled-environment facility communications, wherein controlled-environment facility resident communications devices are configured to receive an indication of initiation of an electronic communication request with a telephone number by, or to, a resident of a controlled environment facility. Therein, a controlled-environment facility communications management system, and/or the like, coupled to the controlled-environment facility resident communications devices may be operable to receive indications of initiation of the electronic communication from the controlled-environment facility resident communications devices. The controlled-environment facility communications management system, and/or the like, may access a database associated with the controlled-environment facility communications management system and determine, based on the contents of the database, whether the telephone number is an Internet Protocol (IP) telephone number.

The database may be a third party database of information related to the telephone number, such as a Line Information Database (LIDB). This LIDB may identify whether the telephone number is an IP telephone number. Alternatively or additionally, the database may be a database of at least IP telephone numbers maintained by the controlled-environment facility communications management system, and/or the like. The determination, based on the contents of the database, may be whether the telephone number is a part of a block of telephone numbers allotted to an IP telephone service provider. Also, a determination may be made, based on the contents of the database, whether the telephone number is a nomadic IP telephone number.

In response to identification of the telephone number as an IP telephone number, the controlled-environment facility communications management system, and/or the like, may take action with respect to the electronic communication. Such action may include the controlled-environment facility communications management system, and/or the like, blocking the electronic communication from being completed and/or connected. Alternatively, the electronic communication may be allowed to proceed, with the controlled-environment facility communications management system, and/or the like, monitoring the electronic communication. Additionally or alternatively, the controlled-environment facility communications management system, and/or the like, may flag or mark the electronic communication and/or request.

Other actions taken in response to identification of an IP telephone number may include the controlled-environment facility communications management system, and/or the like redirecting the electronic communication to a non-IP telephone number associated with a non-resident also associated with the IP telephone number, to tighten security. Thus, the controlled-environment facility communications management system, and/or the like, may further determine whether redirecting the electronic communication to a non-IP telephone number associated with a non-resident also associated with the IP telephone number would result in an increased level of certainty of the non-resident's identity, location, etc., compared to an electronic communication with the IP telephone number. If so, the electronic communication may be redirected to the non-IP telephone number associated with the non-resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
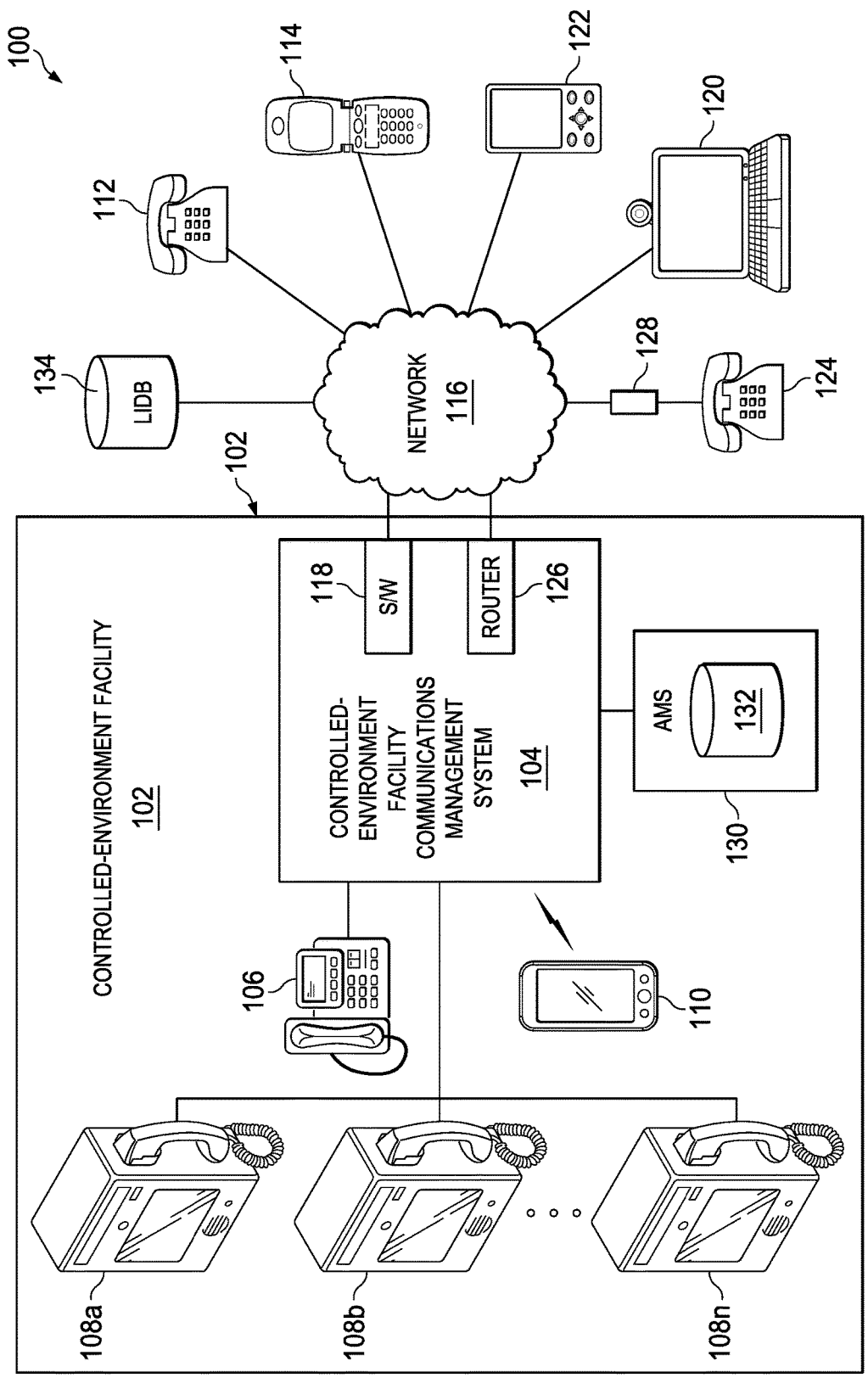
Figure 2:
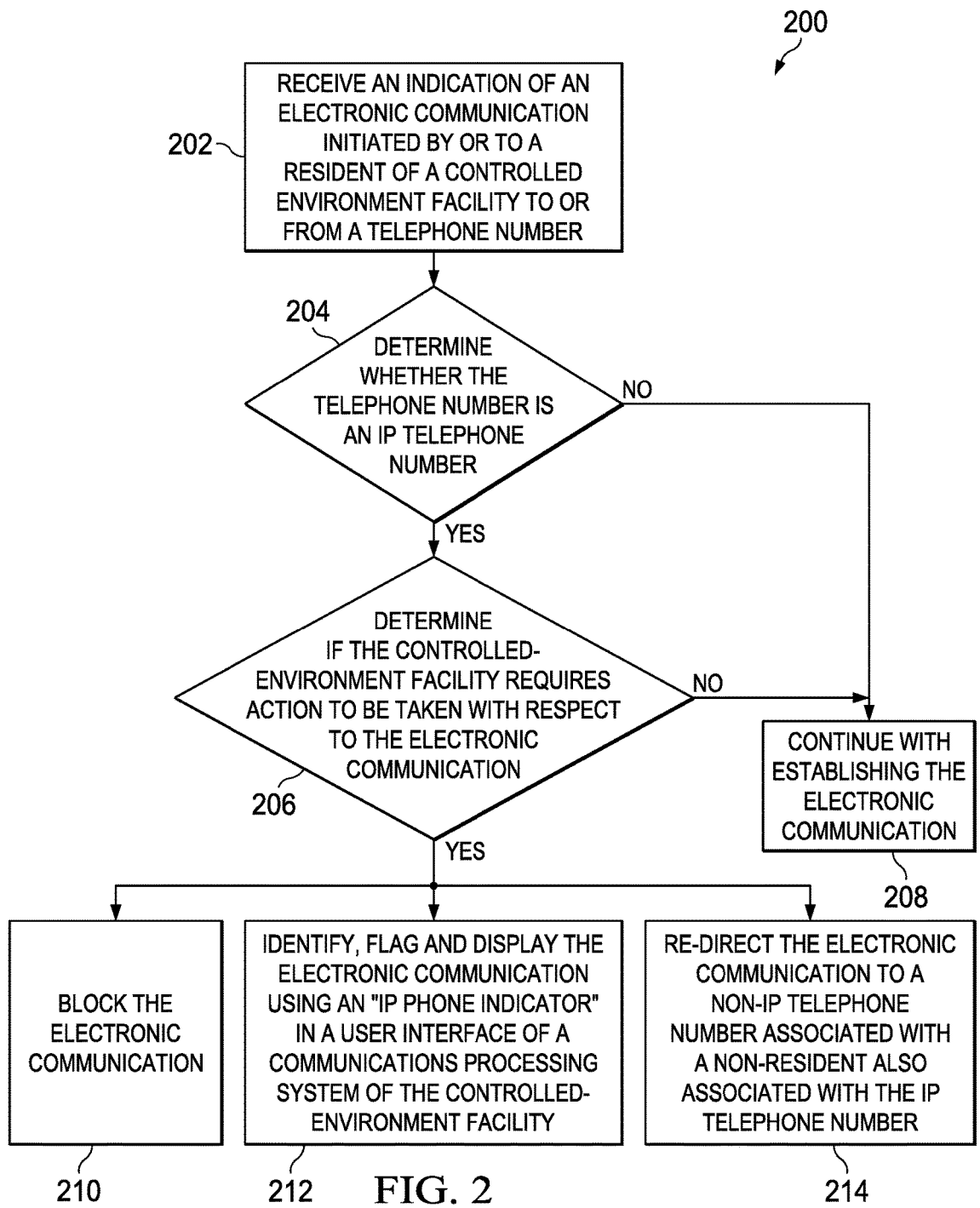
Figure 3:
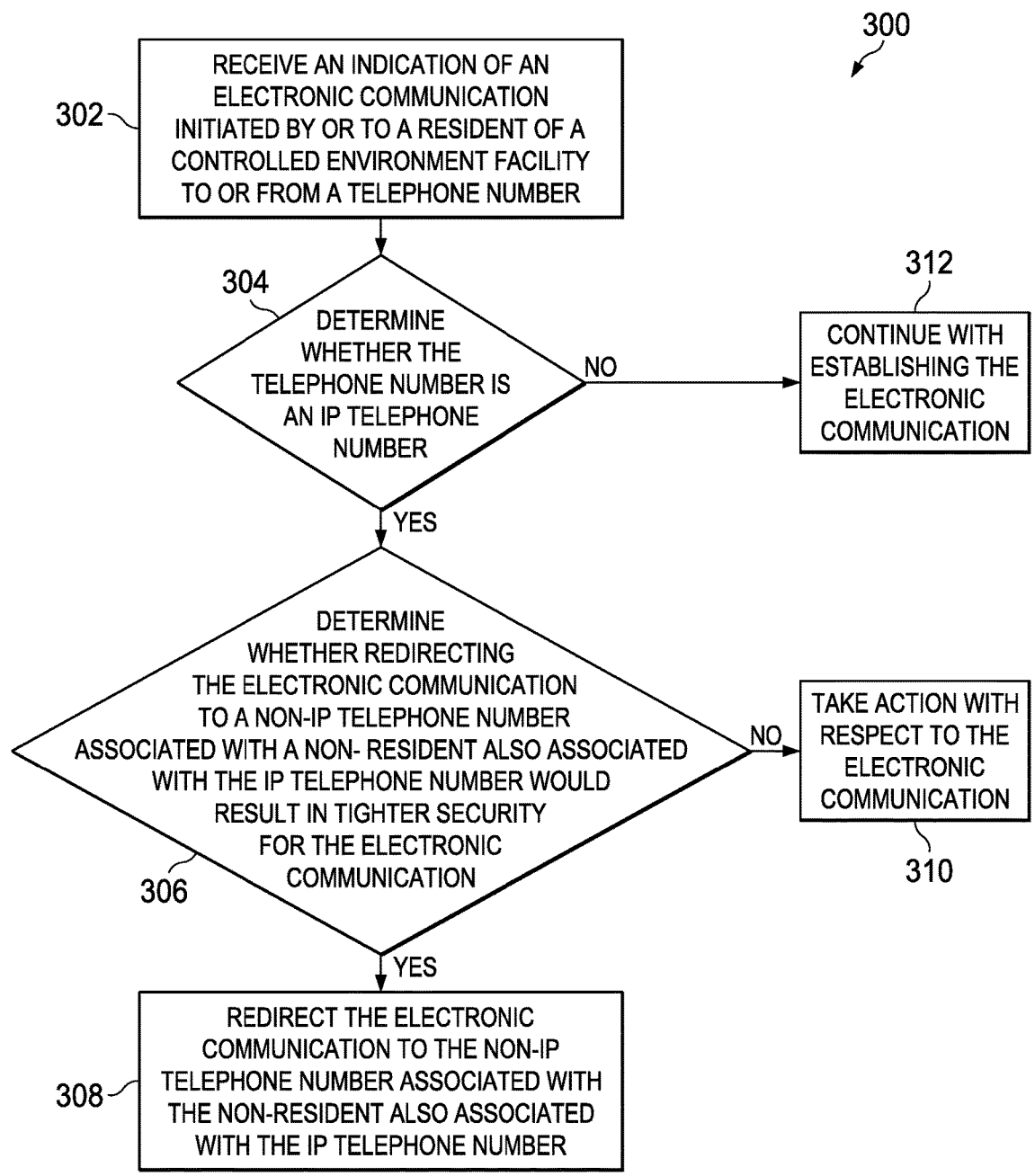
Figure 4:
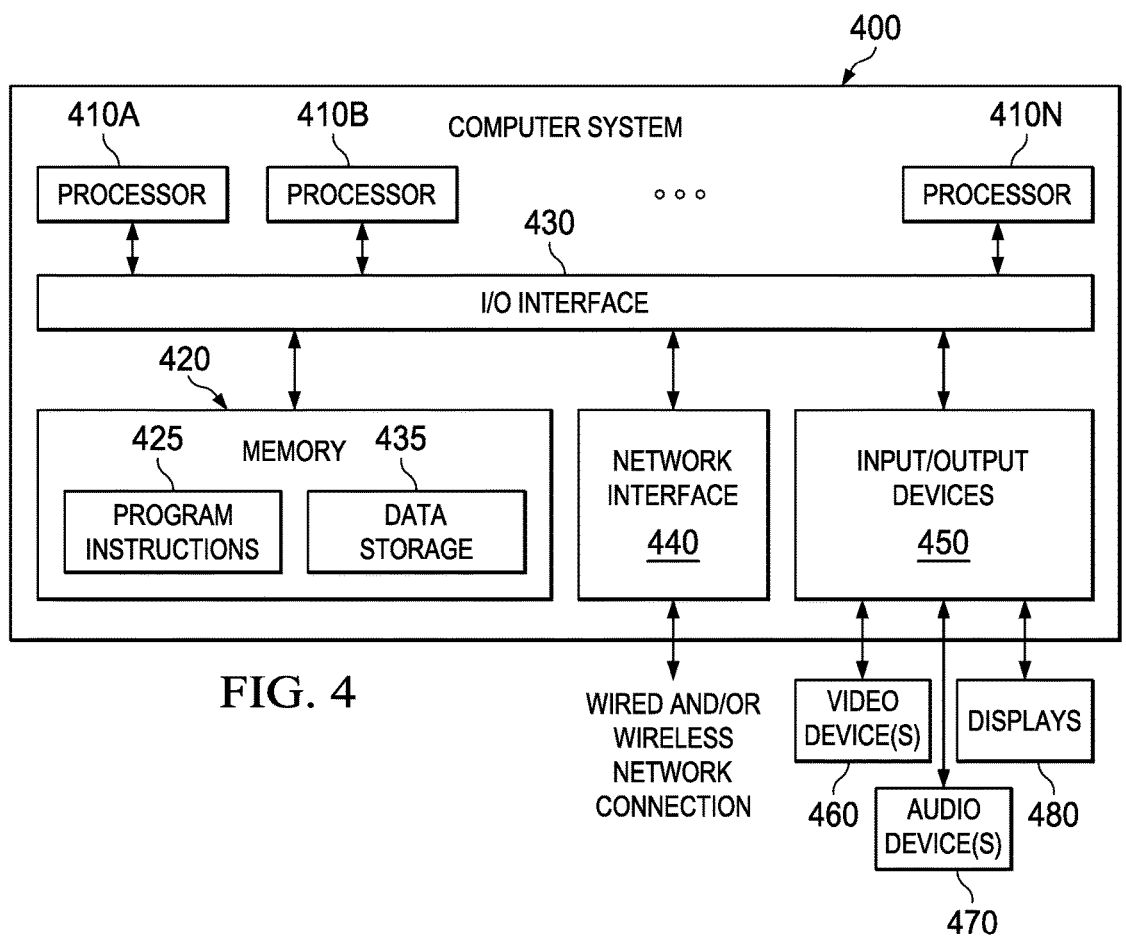

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for identification and taking action on attempted resident communications with Internet Protocol (IP) telephone numbers is shown deployed in conjunction with a controlled-environment facility, according to some embodiments;

FIG. 2 is a flowchart of an example process for identification of, and taking action on, attempted controlled-environment facility resident communications with IP telephone numbers, in accordance with some embodiments;

FIG. 3 is a flowchart of another example process for identification of, and taking action on, attempted controlled-environment facility resident communications with IP telephone numbers, in accordance with some embodiments; and FIG. 4 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods for identification of, and taking action on, attempted communications with Internet Protocol (IP) telephone numbers are related to communications by residents of controlled-environment facilities, specifically related to communication attempts by residents of controlled-environment facilities with IP telephone numbers, and particularly directed to controlled-environment facility communications systems identifying and taking action on resident calls with IP telephone numbers.

In accordance with the present systems and methods, IP telephone number may pose security threats when the controlled-environment facility administration, or communications management system, does not actually know who is on the nonresident side of an electronic communication call, text, video conference, or the like, or even where the other party is located. Generally, controlled-environment facilities, particularly correctional institutions, do not allow remote call forwarding, or the like, since the facility needs true records of who the resident/inmate is communicating with. Problematically, anyone can set up an IP number, employing a spoofed name, alias, false or stolen identity, or the like. While typically, VoIP operators in the US are required to enable law enforcement authorities to conduct surveillance pursuant to the Communications Assistance for Law Enforcement Act (CALEA), and Operators of "Interconnected" VoIP (fully connected to a Publicly Switched Telephone Network (PSTN)) are mandated to provide for customer location updates for 911 call purposes, providers of "nomadic" VoIP service—those who are unable to determine the location of their users—are exempt from many such telecommunications regulation. VoIP does not draw as clear a line, as to the location of a caller or a call's recipient, as the traditional phone system does. VoIP technology has also increased security concerns because VoIP and similar technologies have made it more difficult for law enforcement and others, such as controlled-environment facility officials (e.g. correctional facility officials) to determine where a call party is physically located.

For purposes of the present systems and methods, a "nomadic" phone number is one that is not associated with a physical location. For example, an IP phone number associated with a cable, fiber, or Digital Subscriber Line (DSL) modem, router or IP-PBX may be tied to a physical street address or the like by the cable company or telephone company providing the DSL service, and hence not be considered nomadic. Whereas, an IP telephone number that will work with any internet access, regardless of the equipment providing such access, may be considered nomadic. For example, some IP telephone access requires equipment such as MAJICJACK®, OOMA®, Vonage®, etc., while others such as Google® Voice, Pinger™, etc. operate on a user's wireless phone, tablet or computer without using any special equipment, they operate. Dynamic IP address assignment further exacerbates location questions concerning IP telephone numbers. While a static IP address is typically assigned to cable and DSL internet access equipment, most devices use dynamic IP addresses, which are assigned by the network when they connect.

One of the top concerns with communication from inside a controlled environment facility to outside called parties is the need for security. It is extremely important that communications are monitored and tracked for security purposes. Residents are often restricted to communicating with a limited number of approved individuals. Communications that use nomadic IP addresses create a security threat in otherwise strictly designed services that are in place to monitor, record and locate persons communicating with residents of controlled environment facilities. Use of IP telephony, particularly IP telephony which is nomadic in nature, may mask the true identity and/or location of the outside call party.

Controlled-environment facility communications systems typically perform an LIDB dip, or the like, to detect whether a call is directed to a wireless phone, or a wired phone. In accordance with embodiments of the present systems and methods, the controlled-environment facility communications system may also identify and display a resident-called number as an IP phone, through performing an LIDB dip and providing this information, such as by displaying the information in a controlled-environment facility communications system User Interface (UI), and/or otherwise taking action.

That is, in accordance with embodiments of the present systems and methods, a controlled-environment facility communications management system, and/or the like, receives an indication of an electronic communication request with a telephone number initiated by, or to, a resident of a controlled environment facility. The controlled-environment facility communications management system, and/or the like, accesses a line information database and determines, based on the contents of the line information database, whether the telephone number is an IP telephone number. The controlled-environment facility communications management system, and/or the like, takes action with respect to the electronic communication in response to identification of the telephone number as an IP telephone number.

Turning now to FIG. 1, a diagrammatic illustration of example communications environment 100, wherein an example embodiment of the present systems and methods for identification and taking action on attempted resident communications with IP telephone numbers is shown deployed in conjunction with controlled-environment facility 102, according to some embodiments. Communications management (processing) system 104 may provide telephone services, videoconferencing, online chat, texting and other communication services to controlled-environment facility 102. For example, in some cases, communications management system 104 may be at least partially co-located with controlled-environment facility 102, as shown. Alternatively, communications management system 104 may be at least partially centrally or remotely located with respect to one or more controlled-environment facilities and/or may provide communication services to multiple controlled-environment facilities. More generally, however, it should be noted that communications management system 104 may assume a variety of forms, may be decentralized, and/or may be configured to serve a variety of facilities and/or users, whether within or outside of a controlled-environment facility.

In the context of a correctional facility, for instance, inmates may use telephones 106 to access certain communication services. In some facilities, inmates may also use a video visitation device 108 or a personal computer wireless device, such as a tablet computing device or smartphone 110 to access such services. For example, an inmate may initiate telephone services by lifting the receiver on telephone 106 or video visitation device 108, at which time the inmate may be prompted to provide a personal identification number (PIN), other identifying information or biometrics. An interactive voice response (IVR) unit (not shown) may generate and play prompt or other messages to inmates on devices 106, 108 and/or 110. Similarly, in various embodiments, to access communication services, a resident may launch a communications application program (app) on tablet computing device or smartphone 110 or video visitation device 108. At which time, the resident may be prompted to provide a personal identification number (PIN), other identifying information or biometrics.

Intelligent controlled-environment facility resident communication and media devices employed in accordance with the present systems and methods may include a video visitation device 108, referred to herein as an Intelligent Facility Device (IFD) (e.g. a video phone particularly adapted for use in a controlled-environment facility) or personal computer wireless device 110, referred to herein as an Intelligent Resident Device (IRD) (e.g. a personal wireless device, such as a tablet computing device or smartphone, which may be adapted and/or approved for use in controlled-environment facility), described in greater detail below. Such a device may be referred to as an Intelligent Inmate Device (IID) in a correctional institution environment, and/or an Intelligent Resident Device (IRD), or the like, in controlled-environment facilities, in general. Regardless, as noted, IFDs, IIDs, IRDs, etc. may be generally referred to herein as controlled-environment facility resident communication and/or media devices, or the like, in that they are devices that residents of a controlled-environment facility may use for communication, such as with non-residents, and/or for accessing media.

Video visitation devices 108a-n (each collectively referred to as "IFD 108") are communication devices with video conferencing and/or multimedia capabilities to enable inmates to participate in voice calls, video visitation sessions with non-residents of the correctional facility, secure online chat, Internet access, etc. For example, a non-resident party may have a personal or laptop computer with a camera (or a cell phone, tablet computer, etc.). A network connection between the parties may be established and supported by an organization or commercial service that provides computer services and software for use in telecommunications and/or VoIP, such as SKYPE®. Additionally or alternatively, the correctional facility and/or the destination may use videoconferencing equipment compatible with ITU H.323, H.320, H.264, and/or V.80, or other suitable standards.

In some embodiments, IFDs 108 may be implemented as a computer-based system, which may be located in a pod, which is a separate and self-contained housing unit within a correctional facility designed to hold a number of inmates (e.g., ~12 to 50 prisoners), a visitation area of the correctional facility, or within a sleeping area, such as in a cell. As generally illustrated, each IFD 108 includes display, camera, and handset coupled to device 108 via a wire. The display may be any suitable electronic display such as, for example, a Liquid Crystal Display (LCD), a touchscreen display (e.g., resistive, capacitive, etc.), or the like, whereas the camera may be a suitable imaging device such as, for instance, a video camera or webcam equipped with Charge-Coupled Devices (CCDs), Complementary Metal-Oxide-Semiconductor (CMOS) active pixel sensors, etc. The handset may be similar to a traditional telephone handset including an earpiece portion (with a loudspeaker), a handle portion, and a mouthpiece portion (with a microphone).

During a video visitation session, IFD 108 may be configured to capture a video image of an inmate to be transmitted to a non-resident, and to display a video image of the non-resident to the inmate using the display. IFD 108 may also be configured to capture an audio signal from the inmate to be transmitted to the non-resident using the mouthpiece portion of the handset, and to provide an audio signal from the non-resident to the inmate using the earpiece portion of the handset. Additionally or alternatively, audio received from the non-resident may be reproduced via a loudspeaker, and audio provided by the inmate may be captured via a microphone. In some embodiments, a handset holder or holster may be configured to allow a user to securely rest the handset against device 108 (e.g., in an "on hook" position) when device 108 is not in use. Furthermore, the handset holder may include a mechanical or electromechanical switch or sensor (not shown) that senses when the handset is not resting against it (e.g. is in an "off hook" position).

It should be noted that, outside of correctional facilities, IFD 108 may assume the form of any computer, tablet computer, smart phone, etc., or any other consumer device or appliance with videoconferencing capabilities. Meanwhile, in the context of correctional facilities, IFD 108 may include one or more tampering/impact resistant or hardened elements configured to protect them from vandalism or otherwise destructive acts. For example, one or more of elements may be protected by a transparent plastic or thermoplastic (e.g., Plexiglas, etc.) material and/or IFDs may take the form of a tablet computing device or the like, mounted in a protective case, or the like.

IRDs 110 may be tablet computing devices, smartphones, media players, or the like adapted and/or approved for use by residents of the controlled-environment facility (within the controlled-environment facility). Intelligent resident communication and/or media devices, such as IRDs 110, may include a screen, one or more hardware buttons, and a camera. Each IRD 110 may be particularly adapted for use in a controlled-environment. For example, such an IRD (or IID) may have a specially adapted operating system and/or may be "stripped-down," particularly from the standpoint of what apps and/or hardware are provided or allowed on IRD 110, and/or connectivity afforded such an IRD. For example, such an IRD may employ an operating system kernel, which may be built for use in such an IRD in a controlled-environment facility. As a further example, the IRD may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the structure of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to inmates of correctional facilities, might include apps that may be of particular use to an inmate, in general, such as access to a legal research service, or of more specific interest, such as providing an inmate nearing release, access to employment searching apps or the like. Hence, such inmate IRDs may be used to help soon to be released inmates transition. For example, the IRD may be used to communicate with a future employer, or the like. As such, IRDs may be sponsored, or otherwise subsidized by organizations or companies, assisting with the transition of inmates into society.

As will be appreciated, IFD 108, IRD 110, or other similar devices have video conferencing capabilities, or the like, to enable a party to participate in video communication sessions with other call parties, such as non-residents of the controlled-environment facility, via video communication, secure online chat, etc. Under control of communication processing system 104, devices 106 through 110 may be capable of connecting to a non-resident's (i.e., a person not committed to a controlled-environment facility) telephone 112 or device 114 across network 116, which may be or which may include one or more of a PSTN, an Integrated Services Digital Network (ISDN), Voice-over-IP (VoIP) network, and/or a packet data network (such as, for example the Internet). For example, telephone 112 may be located at a non-resident's home, inmate visitation center, etc. Switch 118 in communication processing system 104 may be used to connect calls across a PSTN. Additionally or alternatively, the non-resident may be at devices 120 or 122, which may be connected to via router 124 of communications management system 104, used to route data packets associated with a call connection to be routed over network 116. Of particular interest to the present systems and methods, VoIP or other IP-based communications services may be provided to a more-or less conventional telephone using the internet (network 116), via IP equipment 128. For example, a VoIP provider, such as MAJICJACK®, OOMA®, Vonage®, etc., may provide VoIP via a conventional telephone (124) that may be plugged into a proprietary converter (128) over an internet connection connected thereto.

In addition to providing certain visitation and communication operations, communication processing system 104 may, such as for example, in a correctional facility embodiment, attempt to ensure that an inmate's calls, video conferences, online chats, etc. are performed only with non-residents whose identities, devices, email addresses, phone numbers, etc. are listed in that inmate's Pre-Approved Contact (PAC) or Personal-Allowed Number (PAN) list. Each inmate's PAC/PAN list may be stored, for example, in database 132 maintained by an Administration and Management System (AMS) 130 (which in correctional environment may be referred to as a Jail Management System (JMS)). In scenarios where communications management system 104 is located within the facility, it may have direct access to AMS 130. In other embodiments, however, communications management system 104 may be located remotely with respect to the controlled-environment facility (or it may have certain elements disposed within the facility and other elements disposed remotely with respect to the facility) and access to AMS 130 may be obtained via a computer network such as, for example network 116.

In addition to PAC/PAN list(s), AMS 130 may also store inmate or Resident Profile Data (RPD), as well as visitation rules applicable to each inmate. As an example, in the context of a correctional facility, database 132 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates. In some embodiments, database 132 may include biometric signatures of inmates (e.g., voice, facial, iris, fingerprint, etc.) and/or of other facility personnel (e.g., correctional officers, staff, etc.). In addition, database 132 may include a Line Information Database (LIDB) and/or controlled-environment facility communications management system 104 may have access to an outside LIDB 134. Outside LIDBs are real-time distributed databases on the North American SS7 signaling network, or the like.

LIDB data records are keyed by telephone number and may include information associated with the telephone number such as telephone number ownership, which may designate the carrier that currently "owns" the telephone number, including an account owner designation which may indicate an operating company number. Of particular importance under the present systems and methods, the account owner may not necessarily be the service provider that has a business relationship with the end subscriber. For example, a carrier may wholesale blocks of telephone numbers to a non-carrier service provider, such as a VoIP or other IP-based communications provider. In such cases the account owner indicated by the LIDB may only be the original operating company, not the VoIP provider, or the like. The LIDB may also include entries associated with a "calling name" associated with the phone number for caller ID purposes or the like. Typically, an LIDB includes information such as a zip code associated with a phone number, Billing Name and Address (BNA) and the like, associated with a phone number, However, in the case of a VoIP number or the like such information may not be available via the LIDB. Traditionally, originating and terminating end office switches query, or "dip" LIDB telephone number records via the SS7 network to obtain attributes of the calling and called telephone numbers needed for call completion. As noted, in a controlled-environment facility environment, a controlled-environment facility communications system may traditionally dip the LIDB to determine whether a resident-called number is a mobile device, or the like. In accordance with embodiments of the present systems and methods, such an LIDB dip may be performed in a further attempt to ascertain whether the resident called number is an IP phone number (e.g. a phone number assigned to a VoIP line, or the like), as discussed in greater detail below.

In accordance with embodiments of the present systems and methods, a controlled-environment facility communications system employing a controlled-environment facility communications management system is configured to receive an indication of initiation of an electronic communication, such as a telephone call, video call, SMS (text) message, online chat, or the like, to or from a telephone number (i.e. to or from a non-resident of the controlled environment facility). For example, a call or text from or to a resident of controlled environment facility 102 may use a controlled-environment facility resident communications device 106, 108 or 110.

To such end, and to facilitate controlled-environment facility resident communications, controlled-environment facility communications management system 104 is, as noted, coupled (via wire, or wirelessly,) to controlled-environment facility resident communications devices 106, 108 or 110. In furtherance of embodiments of the present systems and methods, controlled-environment facility communications management system 104, may, upon receipt of the indication of initiation of an electronic communication from a controlled-environment facility resident communications device, access at least one database associated with controlled-environment facility communications management system 104. Such a database associated with controlled-environment facility communications management system 104 may be an LIDB, which may be a part of AMS database 132, or which may be an outside (third party, ILEC, CLEC, etc.) LIDB (e.g. LIDB 134), or the like. The database is accessed to determine, based on the contents of the database(s), whether the telephone number is associated with an IP telephone number (account) (such as non-resident phone 124). Further, in response to identification of the telephone number as being associated with an IP telephone account, controlled-environment facility communications management system 104 may take action with respect to the electronic communication.

Outside LIDB 134 may identify whether the telephone number is an IP telephone number. Alternatively or additionally, a LIDB maintained by, and/or as a part of controlled-environment facility communications management system 104 and/or AMS 130 may be a database of at least IP telephone numbers (accounts) maintained for purposes of implementation of embodiments of the present systems and methods. (As noted above, AMS database 132 may include other resident and/or call related information as well.) In accordance with some embodiments of the present systems and methods, AMS database 132 may contain information gathered on blocks of telephone numbers sold or otherwise assigned to an IP telephone provider for provisioning to IP telephone customers (such as a non-resident associated with IP phone 124). In such cases, the controlled-environment facility communications management system 104 may determine, based on the contents of AMS database 132, whether the telephone number is a part of such a block of telephone numbers allotted to or otherwise associated with an IP telephone service provider. Further, embodiments of the present controlled-environment facility communications management system 104 may determine, based on the contents of the database, whether the telephone number is associated with a "nomadic" IP telephone number.

As noted, controlled-environment facility communications management system 104 may take action with respect to the electronic communication in response to identification of the telephone number as an IP telephone number. Such action may include, by way of example blocking the electronic communication, such as, by not connecting or otherwise completing establishment of the call, and/or by not allowing the call to go beyond the initiation of the call by the resident, or called party. That is, residents may be blocked from contacting certain individuals, with the use of nomadic numbers, so as to avoid circumventing security features of controlled-environment facility communications management system 104, which could pose a danger to prison security and public safety.

However, in some embodiments, and/or in some situations, controlled-environment facility communications management system 104 may allow the electronic communication to proceed. For example, the communication may be allowed to proceed, and then, the controlled-environment facility communications management system (and/or AMS 130, or the like) may monitor the communication, such as for investigative purposes. Additionally, whether a call with an IP number is allowed to proceed or not, the call or call attempt may be flagged or otherwise marked, such as in a Call Detail Record (CDR) for the call or by providing a notation on a user interface for the controlled-environment facility communications system, for review.

Alternatively, in accordance with some embodiments of the present systems and methods, controlled-environment facility communications management system 104 may redirect an electronic communication to or from an IP telephone number to a non-IP telephone number associated with a non-resident also associated with a detected IP telephone number or account. This may result in higher security for resident communication, compared to an electronic communication with the IP telephone number, such as by preventing attempts to communicate with nomadic communications devices using nomadic IP phone numbers and/or may result in a higher billing rate. Thus, controlled-environment facility communications management system 104 may, in accordance with such embodiments, further determine whether redirecting the electronic communication to such a non-IP telephone number associated with a non-resident also associated with the IP telephone number would mitigate security concerns for the electronic communication (e.g. provide greater certainty as to the non-resident's identity, location, and/or the like) compared to if the electronic communication to the IP telephone number were connected. If so, the electronic communication may then be redirected to the non-IP telephone number associated with the non-resident. Otherwise, the call may be connected as initiated (i.e. between the resident and the IP number), if allowed in accordance with the operative embodiment of the present systems and methods.

FIG. 2 is a flowchart of example process 200 for identification of, and taking action on, attempted controlled-environment facility resident communications with IP telephone numbers, in accordance with some embodiments. Therein, an indication of an electronic communication, such as a telephone call, video call, SMS (text) message, or the like, initiated by, or to, a resident of a controlled environment facility is received at 202.

At 204, a determination is made as to whether the telephone number is an IP telephone number (i.e. associated with an IP telephony account). As a part of the determination at 204 information related to the telephone number may be received from a third party database, such as an outside LIDB (134), such as where the LIDB identifies the telephone number as an IP telephone number. Additionally or alternatively, determining at 204 whether the telephone number is an IP telephone number may call for consulting a database (132) of IP telephone number, associated with, and/or otherwise maintained by, the controlled-environment facility communications management system (104) and/or a controlled-environment facility administration and management system. For example, determining whether the telephone number is an IP telephone number at 204 may include determining whether the telephone number is a part of a block of telephone numbers allotted to an IP telephone service provider for provisioning to IP telephone customers. The determination at 204 may also include determining whether the IP telephone number is nomadic, as discussed above.

If it is determined at 204 that the telephone number is an IP telephone number, then a determination may be made at 206 whether the controlled-environment facility requires that action be taken with respect to resident electronic communications with IP telephone numbers. This determination may be based on controlled-environment facility rules such as maintained on a controlled-environment facility administration and management system database (132) and enforced or implemented by the controlled-environment facility administration and management system (130), such as through a controlled-environment facility communication processing system (104), whether that communication processing system is local to the controlled-environment facility (102) or centrally located external to the facility, as described above.

However, if it is determined at 204 that the telephone number is not an IP telephone number and/or it is determined at 206 that the controlled-environment facility does not require that action be taken with respect to resident electronic communications with IP telephone numbers (at least with respect to the resident participating in the electronic communication), the call all may be connected at 208.

However, if it is determined at 204 that the telephone number is an IP telephone number and it is determined at 206 that the controlled-environment facility does require that action be taken with respect to resident electronic communications with IP telephone numbers, an action, such as illustrated measures 210, 212, 214, or the like may be taken. For example, the electronic communication with the IP number may be blocked from being completed (i.e. not connected) at 210. Alternatively, the electronic communication may be allowed to proceed and the communication may be monitored or recorded (e.g. for investigative purposes). At 212 the electronic communication may be flagged or otherwise marked for review. Such as by identifying, flagging and displaying a notice of the electronic communication using an "IP Phone indicator" or the like in a UI of a controlled-environment facility communications management system (104), or the like, whether the call is completed or not, and monitored/recorded, or not, etc. Further, a call may be marked or flagged by notating a CDR, or the like related to the communication (attempt). Other action may call for redirecting the electronic communication to a non-IP telephone number associated with a non-resident also associated with the IP telephone number at 214, such as wherein redirecting the electronic communication to the non-IP telephone number associated with a non-resident results in a higher level of security for the electronic communication than an electronic communication to the IP telephone number and/or may result in a higher billing rate. This redirection may provide greater security if it will result in greater certainty as to the non-resident's identity, location, and/or the like. Hence, a determination with respect to whether the IP telephone number is nomadic may affect the selection of the action taken.

Some embodiments of a process for identification of, and taking action on, attempted controlled-environment facility resident communications with IP telephone numbers may be implemented to facilitate maximizing security for controlled-environment facility resident communications systems. FIG. 3 is a flowchart of example process 300 for identification of, and taking action on, attempted controlled-environment facility resident communications with IP telephone numbers, in accordance with some embodiments. An indication of an electronic communication initiated by, or to, a resident of a controlled environment facility is again received at 302. At 304, a determination is made as to whether the telephone number is an IP telephone number (i.e. associated with an IP telephony account), such as in a manner discussed above with respect to step 204 of process 200. The determination at 304 may also include determining whether the IP telephone number is nomadic, as also discussed above.

If it is determined at 304 that the telephone number is an IP telephone number, then at 306 a determination may be made whether redirecting the electronic communication to a non-IP telephone number associated with a non-resident also associated with the IP telephone number or account would result in a tighter security for the electronic communication than an electronic communication with the IP telephone number. For example, a determination may be made at 306 as to whether redirection of the call would result in greater certainty as to the non-resident's identity, location, and/or the like. If so, the electronic communication may be redirected to the non-IP telephone number associated with the non-resident at 308. As discussed above, this may circumvent attempts to cause security breaches for controlled-environment facility calls by employing an IP line having a local area code (and prefix) for the non-resident end of the communication, or the like. Also, other action may be taken, as discussed above with respect to steps 206, 210, 212 and 214 of process 200, and the like. However, if it is determined at 306 that the electronic communication with the non-IP telephone number will not result in improved security for the electronic communication, compared to an electronic communication with the IP telephone number, such action(s), or other action(s), may be taken at 310. For example, the call may be connected and allowed to proceed normally, the electronic communication may be blocked, the electronic communication may be allowed but monitored, the electronic communication may be flagged or marked (such as by displaying a notice of the (attempted) communication on a controlled-environment facility communications system UI or noting a CDR), etc. Again, a determination with respect to whether the IP telephone number is nomadic may affect the selection of the action taken. However, also, if it is determined at 304 that the telephone number is not an IP telephone number, the call may be connected at 312.

Embodiments of the present systems and methods for identification of, and taking action on, attempted controlled-environment facility resident communications with IP telephone numbers, as described herein, may be implemented or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example processes 200 and/or 300 described above with respect to FIGS. 2 and 3, and/or a computer system such as computer system 400 may be used as, or as part of, one or more of controlled environment facility communications management system 104, IFD 108, IRD 110, non-resident devices 120 and 122, AMS 130 and/or the like. In various embodiments two or more of these computer systems may be configured to communicate with each other in any suitable way, such as, for example, via a network.

As illustrated, example computer system 400 includes one or more processors 410 coupled to a system memory 420 via an input/output (I/O) interface 430. Example computer system 400 further includes a network interface 440 coupled to I/O interface 430, and one or more input/output devices 450, such as video device(s) 460 (e.g., a camera), audio device(s) 470 (e.g., a microphone and/or a speaker), and display(s) 480. Computer system 400 may also include a cursor control device (e.g., a mouse or touchpad), a keyboard, etc. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In various embodiments, computer system 400 may be a single-processor system including one processor 410, or a multi-processor system including two or more processors 410 (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 3, above, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-readable medium may include any tangible or non-transitory storage media or memory media such as magnetic or optical media—e.g., disk or CD/DVD-ROM coupled to computer system 400 via I/O interface 430, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 440.

In some embodiments, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any suitable protocol, timing or other data transformations to convert data signals from one component (e.g., system memory 420) into a format usable by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments, some or all of the functionality of I/O interface 430, such as an interface to system memory 420, may be incorporated into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 4, memory 420 may include program instructions 425, configured to implement certain embodiments described herein, and data storage 435, comprising various data accessible by program instructions 425. In an embodiment, program instructions 425 may include software elements corresponding to one or more of the various embodiments illustrated in the above figures. For example, program instructions 425 may be implemented in various embodiments using any desired programming language, scripting language, or combination of programming languages and/or scripting languages (e.g., C, C++, C#, JAVA®, JAVASCRIPT®, PERL®, etc.). Data storage 435 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility communications system comprising:
   at least one controlled-environment facility resident communications device configured to receive an indication of initiation of an electronic communication request with a telephone number by or to a resident of a controlled environment facility; and
   a controlled-environment facility communications management system coupled to the at least one controlled-environment facility resident communications device and comprising a memory, and a processor coupled to the memory, the processor operable to:
      receive the indication of initiation of the electronic communication from the at least one controlled-environment facility resident communications device;
      access a database associated with the controlled-environment facility communications management system;
      determine, based on the contents of the database, whether the telephone number is an internet protocol telephone number; and
      take action with respect to the electronic communication in response to identification of the telephone number as an internet protocol telephone number, including at least redirecting the electronic communication to a non-internet protocol telephone number associated with a non-resident also associated with the internet protocol telephone number.

2. The system of claim 1, wherein the database is a third party database of information related to the telephone number.

3. The system of claim 2, wherein the third party database is a line information database.

4. The system of claim 3, wherein the line information database identifies whether the telephone number is an internet protocol telephone number.

5. The system of claim 1, wherein the database is a database of at least internet protocol telephone numbers maintained by the controlled-environment facility communications management system.

6. The system of claim 1, wherein the processor is further operable to determine, based on the contents of the database, whether the telephone number is a part of a block of telephone numbers allotted to an internet protocol telephone service provider.

7. The system of claim 1, wherein the processor is further operable to determine, based on the contents of the database, whether the telephone number is a nomadic internet protocol telephone number.

8. The system of claim 1, wherein the action further comprises the controlled-environment facility communications management system monitoring the electronic communication.

9. The system of claim 1, wherein the action further comprises the controlled-environment facility communications management system flagging or marking the electronic communication and/or request.

10. The system of claim 1, wherein the controlled-environment facility communications management system further determines whether redirecting the electronic communication to the non-internet protocol telephone number associated with the non-resident also associated with the internet protocol telephone number would result in an increased level of certainty of the non-resident's identity and/or location compared to an electronic communication with the internet protocol telephone number prior to, and the redirecting the electronic communication to the non-internet protocol telephone number associated with the non-resident is carried out in response to a determination that the electronic communication with the non-internet protocol telephone number results in the increased level of certainty of the non-resident's identity and/or location compared to an electronic communication with the internet protocol telephone number.

11. A controlled-environment facility communications system implemented method comprising:
   receiving an indication of an electronic communication request initiated by or to a resident of a controlled environment facility with a telephone number;
   determining whether the telephone number is an internet protocol telephone number; and
   taking action with respect to the electronic communication in response to identification of the telephone number as an internet protocol telephone number, including at least redirecting the electronic communication to a non-internet protocol telephone number associated with a non-resident also associated with the internet protocol telephone number.

12. The method of claim 11, further comprising receiving, from a third party database, information related to the telephone number.

13. The method of claim 11, wherein the third party database is a line information database.

14. The method of claim 13, wherein determining whether the telephone number is an internet protocol telephone number comprises the line information database identifying the telephone number as an internet protocol telephone number.

15. The method of claim 11 wherein determining whether the telephone number is an internet protocol telephone number comprises consulting a database of internet protocol telephone numbers associated with and/or maintained by the controlled-environment facility communications system.

16. The method of claim 11, wherein determining whether the telephone number is an internet protocol telephone number further comprises determining whether the telephone number is a part of a block of telephone numbers allotted to an internet protocol telephone service provider.

17. The method of claim 11, further comprising determining whether the internet protocol telephone number is a nomadic internet protocol telephone number.

18. The method of claim 11, wherein the action further comprises monitoring the electronic communication.

19. The method of claim 11, wherein the action further comprises flagging and/or marking the electronic communication and/or request.

20. The method of claim 11, wherein redirecting the electronic communication to the non-internet protocol telephone number associated with a non-resident results in an increased level of certainty of the non-resident's identity and/or location than an electronic communication with the internet protocol telephone number.

21. The method of claim 11, further comprising determining whether redirecting the electronic communication to the non-internet protocol telephone number associated with the non-resident also associated with the internet protocol telephone number would result in an increased level of certainty of the non-resident's identity and/or location compared to an electronic communication with the internet protocol telephone number, and wherein the redirecting the electronic communication to the non-internet protocol telephone number associated with the non-resident is carried out in response to a determination that the electronic communication with the non-internet protocol telephone number results in an increased level of certainty of the non-resident's identity and/or location compared to an electronic communication with the internet protocol telephone number.

22. A tangible non-transitory computer-readable storage medium having program instructions stored thereon that, upon execution by a controlled-environment facility communications system, cause the controlled-environment facility communications system to:
   receive an indication of an electronic communication request with a telephone number initiated by or to a resident of a controlled environment facility;
   access a line information database;
   determine, based on the contents of the line information database, whether the telephone number is an internet protocol telephone number; and
   take action with respect to the electronic communication in response to identification of the telephone number as an internet protocol telephone number, including at least redirecting the electronic communication to a non-internet protocol telephone number associated with a non-resident also associated with the internet protocol telephone number.

* * * * *